(12) United States Patent
Chewning et al.

(10) Patent No.: US 11,774,658 B2
(45) Date of Patent: Oct. 3, 2023

(54) EXTERNAL INDICATOR ASSEMBLY FOR A ROBOT CENTRAL PROCESSING UNIT

(71) Applicant: Volvo Car Corporation, Gothenburg (SE)

(72) Inventors: Les Chewning, Ridgeville, SC (US); David Joiner, Summerville, SC (US)

(73) Assignee: Volvo Car Corporation, Gothenburg (SE)

( * ) Notice: Subject to any disclaimer, the term of this patent is extended or adjusted under 35 U.S.C. 154(b) by 85 days.

(21) Appl. No.: 17/368,940

(22) Filed: Jul. 7, 2021

(65) Prior Publication Data

US 2023/0015577 A1     Jan. 19, 2023

(51) Int. Cl.
| | |
|---|---|
| *F21V 8/00* | (2006.01) |
| *G02B 6/36* | (2006.01) |
| *G08B 5/36* | (2006.01) |
| *G06F 1/18* | (2006.01) |

(52) U.S. Cl.
CPC ......... *G02B 6/0008* (2013.01); *G02B 6/3628* (2013.01); *G06F 1/182* (2013.01); *G08B 5/36* (2013.01)

(58) Field of Classification Search
CPC ...... G02B 6/0008; G02B 6/3628; G02B 6/36; G06F 1/182; G08B 5/36
See application file for complete search history.

(56) References Cited

U.S. PATENT DOCUMENTS

2016/0125706 A1*   5/2016   Butterbaugh ............ G08B 5/36
                                             340/815.45
2018/0114653 A1*   4/2018   Amirthasamy ........ H01H 9/161

* cited by examiner

*Primary Examiner* — Tina M Wong
(74) *Attorney, Agent, or Firm* — Clements Bernard Walker; Christopher L. Bernard

(57) ABSTRACT

An external indicator assembly for a central processing unit (CPU) disposed within an equipment cabinet, including: an internal fitting adapted to be disposed adjacent to indicator lights associated with the CPU; an external fitting adapted to be coupled to or disposed through an external surface of the equipment cabinet; and one or more optical fibers adapted to be coupled between the internal fitting and the external fitting such that light from the indicator lights is transmitted from the CPU disposed within the equipment cabinet external to the equipment cabinet such that the light is visible to a person external to the equipment cabinet. This allows the person to visually assess the status or power-down cycling of the CPU during a shutdown or restart process without or before opening the equipment cabinet, thereby preventing corruption of the CPU and assuring personal safety by avoiding contact with powered components.

20 Claims, 7 Drawing Sheets

EXTERNAL INDICATOR ASSEMBLY FOR A ROBOT CENTRAL PROCESSING UNIT

TECHNICAL FIELD

The present disclosure relates generally to the manufacturing equipment field. More particularly, the present disclosure relates to an external indicator assembly for a robot central processing unit (CPU), such as that used in the automotive manufacturing field.

BACKGROUND

Inherent to all controller-based units is the need for an occasional cycling of the power switch to restore proper operating function. This practice is not prudent because a CPU must complete its restart file before powering completely down.

Safety considerations restrict persons from entering an energized equipment cabinet, but to quickly cycle the power switch without knowing that the CPU has completely shut down may corrupt the flash drive used to boot up the system. If this flash drive is corrupted, the system may not boot up properly.

One common solution to these problems is to cut the power to a system and then wait a period of time (e.g., 30 seconds) before re-energizing an equipment cabinet. What would be more effective would be to provide the ability to ensure that a CPU has completed its power-down process and generated an appropriate "BIN" file without opening the equipment cabinet, thus allowing a person to re-energize the system properly and safely. This would require visibility of the CPU indicator lights, which are normally only visible inside the equipment cabinet, when it is opened, external to the equipment cabinet, when it is still closed.

This background is provided as an illustrative contextual environment only. It will be readily apparent to those of ordinary skill in the art that the systems, assemblies and methods of the present disclosure may be implemented in other contextual environments as well.

SUMMARY

The present disclosure provides the ability to ensure that a CPU has completed its power-down process and generated an appropriate "BIN" file without opening the equipment cabinet, thus allowing a person to re-energize the system properly and safely. The present disclosure provides visibility of the CPU indicator lights, which are normally only visible inside the equipment cabinet, when it is opened, external to the equipment cabinet, when it is still closed. More particularly, the present disclosure provides a fitting that is installed within the equipment cabinet adjacent to the CPU indicator lights and a fitting that is installed on the outside of the equipment cabinet. These two fittings retain and are coupled together by fiber optic filaments that transmit light from the CPU indicator lights within the equipment cabinet to the outside of the equipment cabinet, such that the CPU indicator lights can be observed by a person without opening the equipment cabinet. This allows the person to visually assess the status or power-down cycling of the CPU during a shutdown or restart process without or before opening the equipment cabinet, thereby preventing corruption of the CPU memory file and assuring personal safety by avoiding contact with powered components.

In one illustrative embodiment, the present disclosure provides an external indicator assembly for a central processing unit disposed within an equipment cabinet, the external indicator assembly including: an internal fitting adapted to be disposed adjacent to one or more indicator lights associated with the central processing unit; an external fitting adapted to be coupled to or disposed through an external surface of the equipment cabinet; and one or more optical fibers adapted to be coupled between the internal fitting and the external fitting such that light from the one or more indicator lights is transmitted from the central processing unit disposed within the equipment cabinet external to the equipment cabinet such that the light is visible to a person external to the equipment cabinet. The internal fitting includes a central processing unit attachment plate and a fiber optic coupler. Optionally, the fiber optic coupler is integrally formed with the central processing unit attachment plate. Alternatively, the fiber optic coupler is press-fit into a receptacle formed in the central processing unit attachment plate. The fiber optic coupler defines one or more ports configured to receive the one or more optical fibers and hold an end of each of the one or more optical fibers adjacent to a corresponding one of the one or more indicator lights. The external fitting defines one or more ports configured to receive the one or more optical fibers and hold an end of each of the one or more optical fibers such that light from the end of the optical fiber is visible to the person external to the equipment cabinet. Optionally, the one or more indicator lights include a plurality of indicator lights and the one or more optical fibers include a plurality of optical fibers adapted to be coupled between the internal fitting and the external fitting.

In another illustrative embodiment, the present disclosure provides an equipment cabinet, including: a housing defining an opening; one of a door and a cover adapted to close the opening defined by the housing; a central processing unit disposed within the housing; an external indicator assembly, including: an internal fitting adapted to be disposed adjacent to one or more indicator lights associated with the central processing unit; an external fitting adapted to be coupled to or disposed through one of the housing, the door, and the cover; and one or more optical fibers adapted to be coupled between the internal fitting and the external fitting such that light from the one or more indicator lights is transmitted from the central processing unit disposed within the housing external to the housing such that the light is visible to a person external to the equipment cabinet. The internal fitting includes a central processing unit attachment plate and a fiber optic coupler. Optionally, the fiber optic coupler is integrally formed with the central processing unit attachment plate. Alternatively, the fiber optic coupler is press-fit into a receptacle formed in the central processing unit attachment plate. The fiber optic coupler defines one or more ports configured to receive the one or more optical fibers and hold an end of each of the one or more optical fibers adjacent to a corresponding one of the one or more indicator lights. The external fitting defines one or more ports configured to receive the one or more optical fibers and hold an end of each of the one or more optical fibers such that light from the end of the optical fiber is visible to the person external to the equipment cabinet. Optionally, the one or more indicator lights include a plurality of indicator lights and the one or more optical fibers include a plurality of optical fibers adapted to be coupled between the internal fitting and the external fitting. Optionally, the equipment cabinet is an automotive manufacturing robot equipment cabinet.

In a further illustrative embodiment, the present disclosure provides a method for installing an external indicator assembly for a central processing unit disposed within an equipment cabinet, the method including: disposing an internal fitting adjacent to one or more indicator lights associated with the central processing unit; coupling an external fitting to or disposing the external fitting through an external surface of the equipment cabinet; and coupling one or more optical fibers between the internal fitting and the external fitting such that light from the one or more indicator lights is transmitted from the central processing unit disposed within the equipment cabinet external to the equipment cabinet such that the light is visible to a person external to the equipment cabinet. The internal fitting includes a central processing unit attachment plate and a fiber optic coupler. Optionally, the method includes press-fitting the fiber optic coupler into a receptacle formed in the central processing unit attachment plate. The fiber optic coupler defines one or more ports configured to receive the one or more optical fibers and hold an end of each of the one or more optical fibers adjacent to a corresponding one of the one or more indicator lights. The external fitting defines one or more ports configured to receive the one or more optical fibers and hold an end of each of the one or more optical fibers such that light from the end of the optical fiber is visible to the person external to the equipment cabinet.

BRIEF DESCRIPTION OF THE DRAWINGS

The present disclosure is illustrated and described herein with reference to the various drawings, in which like reference numbers are used to denote like system and assembly components/method steps, as appropriate, and in which:

FIG. 1 is a partial perspective view of the CPU indicator lights and adjacent structures within an equipment cabinet or a manufacturing robot or the like;

DESCRIPTION OF ILLUSTRATIVE EMBODIMENTS

Again, the present disclosure provides the ability to ensure that a CPU has completed its power-down process and generated an appropriate "BIN" file without opening the equipment cabinet, thus allowing a person to re-energize the system properly and safely. The present disclosure provides visibility of the CPU indicator lights, which are normally only visible inside the equipment cabinet, when it is opened, external to the equipment cabinet, when it is still closed. More particularly, the present disclosure provides a fitting that is installed within the equipment cabinet adjacent to the CPU indicator lights and a fitting that is installed on the outside of the equipment cabinet. These two fittings retain and are coupled together by fiber optic filaments that transmit light from the CPU indicator lights within the equipment cabinet to the outside of the equipment cabinet, such that the CPU indicator lights can be observed by a person without opening the equipment cabinet. This allows the person to visually assess the status or power-down cycling of the CPU during a shutdown or restart process without or before opening the equipment cabinet, thereby preventing corruption of the CPU memory file and assuring personal safety by avoiding contact with powered components.

Figure 1:
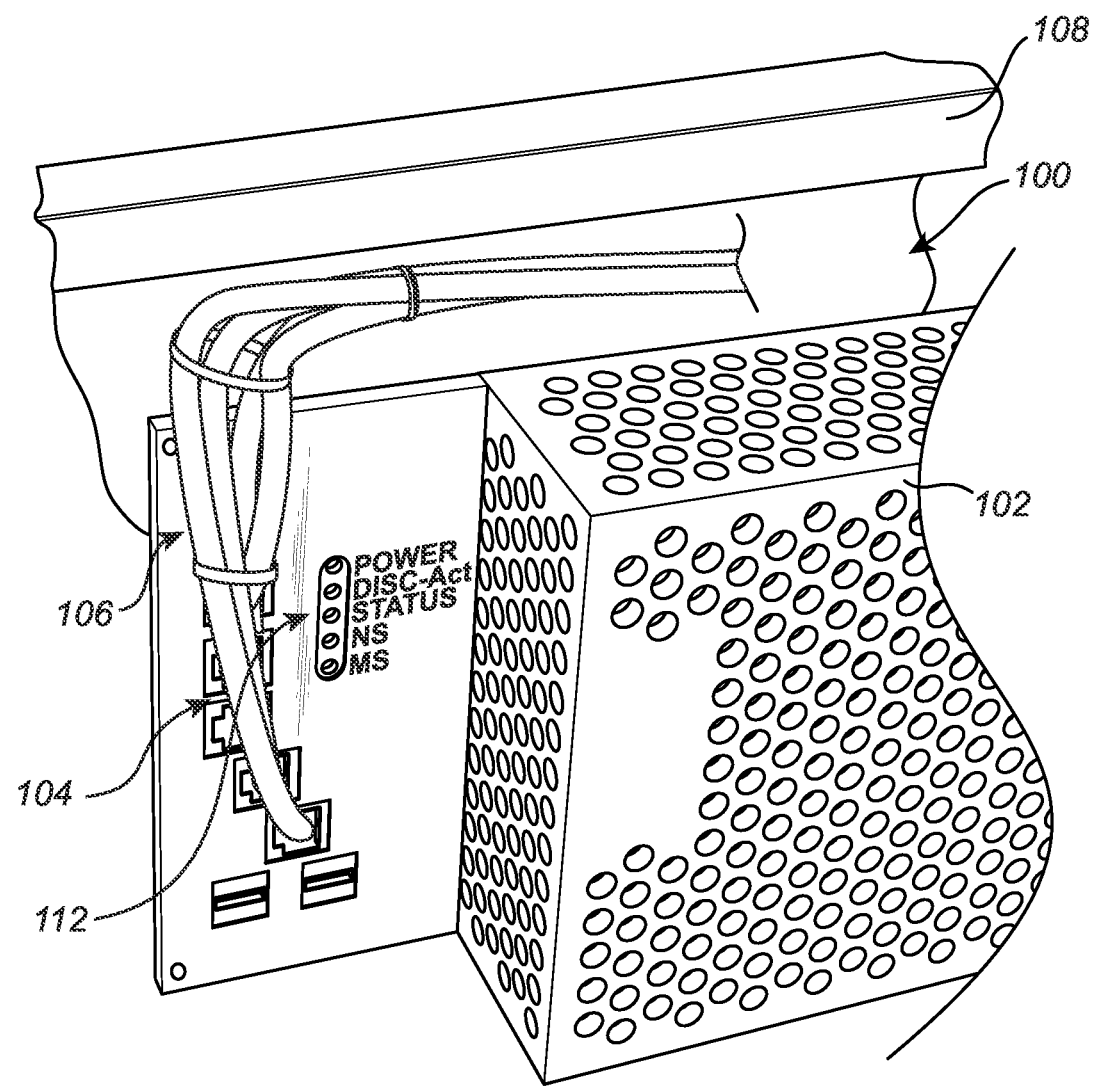
Figure 2:
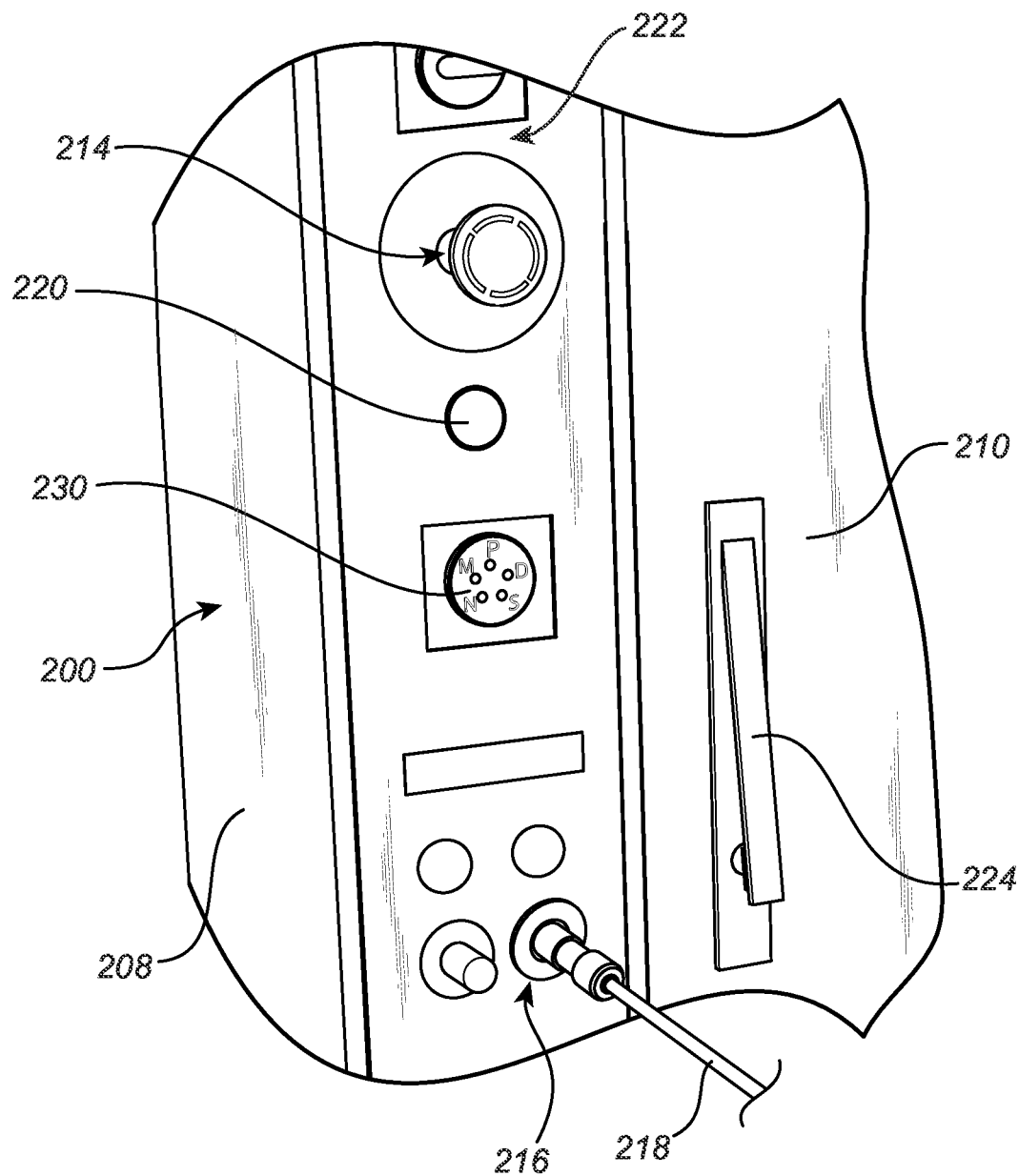
FIG. 2 is a partial perspective view of the exterior of the equipment cabinet with one illustrative embodiment of the external fitting of the present disclosure installed, thereby transmitting light from the CPU indicator lights within the equipment cabinet to the exterior of the equipment cabinet where they can be visually observed by a person without opening the equipment cabinet.

Referring now specifically to FIG. 1, the interior of an equipment cabinet 100, such as an automotive manufacturing robot equipment cabinet or the like, includes a CPU 102 and a plurality of connection ports 104 by which electrical and communications connections are made via a plurality of cables 106. These components are all disposed within the housing 108 of the equipment cabinet 100, which defines an opening that is selectively closed by a door or cover 210 (FIG. 2). It will be readily apparent to those of ordinary skill in the art that a plurality of other components may also be disposed within the housing 108 of the equipment cabinet 100, although the components are not described in greater detail herein. Typically, the housing 108 is a ruggedized metal structure that is suitable for use in a manufacturing facility or the like. A plurality of indicator lights 112 are provided within the housing 108 on or adjacent to the CPU 102 and indicate the operational status of the CPU 102. For example, the indicator lights 112 may include a plurality of light-emitting diodes (LEDs) or the like of different colors that indicate the operational status of the CPU 102. In the illustrative embodiment shown, the indicator lights 112 include POWER, DISC-Act, STATUS, NS, and MS lights arranged in a vertical array, although other lights can also be provided in any suitable configuration. In general, these indicator lights 112 indicate the power, memory access, and operational status of the CPU 102. Of note, the indicator lights are typically only visible to a person when viewing the CPU 102 within the equipment cabinet 100 with the door or cover 210 open. This creates a safety issue if the door or cover 210 is opened without the CPU 102 being fully powered-down. The memory of the CPU 102 can also be corrupted if power to the CPU 102 is cut while the indicator lights 112 still indicate that the CPU 102 is actively processing, regardless of whether or not they can be seen with the door or co er 210 closed.

Referring now specifically to FIG. 2, the exterior of the equipment cabinet 200 includes a user panel 214 that typically includes a plurality of connection ports 216 by which electrical and communications connections are made via a plurality of cables 218, a power switch 220 for powering up and powering down the CPU 102 (FIG. 1), and a plurality of controls 222 for controlling the various systems and functions of the CPU 102 and the automotive manufacturing robot or the like. The door or cover 210 of the equipment cabinet 200 includes a handle mechanism 224 for selectively opening the door 210 or removing the cover 210, when appropriate. This handle mechanism 224 may be a safety release or locking handle mechanism.

As illustrated, the user panel 214 of the equipment cabinet 200 includes an external fitting 230 of the external indicator assembly 332 (FIG. 3) of the present disclosure, by which light from the indicator lights 112 (FIG. 1) of the CPU 102 (FIG. 1) inside the equipment cabinet 200 is made visible outside the equipment cabinet 200 when the equipment cabinet 200 is closed. This external indicator assembly 332 is described in greater detail herein below.

Figure 3:
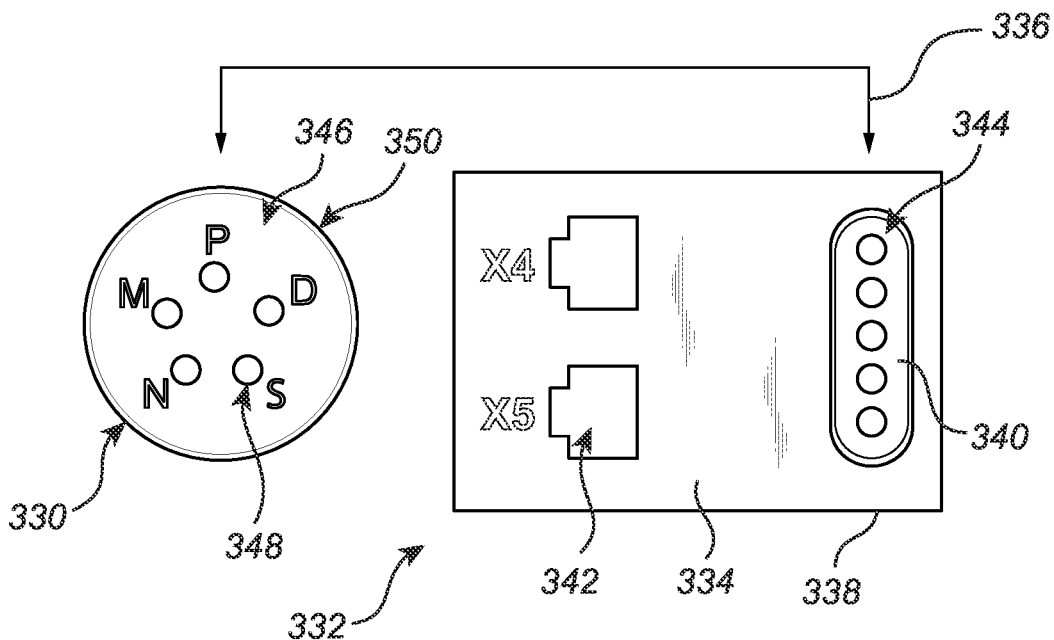
FIG. 3 is a front planar view of one illustrative embodiment of the internal fitting of the present disclosure and one illustrative embodiment of the external fitting of the present disclosure.

Referring now specifically to FIG. 3, the external indicator assembly 332 of the present disclosure includes the external fitting 330 (mentioned above) that is disposed on and/or through an exterior surface of the housing 108 (FIG. 1), 208 (FIG. 2) or the door or cover 210 (FIG. 2) of the equipment cabinet 100 (FIG. 1), 200 (FIG. 2), and an internal fitting 334 that is disposed adjacent to the indicator lights 112 (FIG. 1) of the CPU 102 (FIG. 1) within the housing 108, 208 of the equipment cabinet 100, 200. The internal fitting 334 is optically coupled to the external fitting 330 by one or more, and likely a plurality of, optical fibers 336 that transmit light from the indicator lights 112 to the exterior of the housing 108, 208 of the equipment cabinet 100, 200, where the lights are visible to a person without opening the door or cover 210 of the equipment cabinet 100, 200. Each of the internal fitting 334 and the external fitting 330 may be manufactured (molded, 3-D printed, etc.) from a plastic material, or any other suitable semi-rigid or rigid material. The optical fibers 336 may consist of 2-mm optical filaments or the like that may be individual or bundled for handling convenience and durability purposes.

As illustrated, the internal fitting 334 includes a CPU attachment plate 338 that is disposed adjacent to the indicator lights 112 of the CPU 102 and a fiber optic coupler 340 that is configured to receive and retain the ends of the optical fibers 336, holding the ends of the optical fibers 336 adjacent to and optically coupling them with the indicator lights 112. In this illustrative embodiment, the CPU attachment plate 334 is a planar structure that includes cutouts 342 corresponding to one or more of the connectors 104 (FIG. 1) of the CPU 102. The CPU attachment plate 334 is thereby secured to the face of the CPU 102 adjacent to the indicator lights 112 by plugging the cables 106 (FIG. 1) into the one or more connectors 104 through the CPU attachment plate 334. It will be readily apparent to those of ordinary skill in the art that other attachment means could be used as well, such as bolts, snaps, or other fasteners. In this illustrative embodiment, the fiber optic coupler 340 is an elongate structure coupled to the CPU attachment plate 334 that defines an array of ports or holes 344 that are configured to receive the ends of the optical fibers 336 and hold the ends of the optical fibers 336 adjacent to the indicator lights 112, such that light from each of the indicator lights 112 is transmitted through a corresponding one of the optical fibers 336. Accordingly, the shape of the fiber optic coupler 340 and the arrangement of the ports or holes 344 preferably corresponds to the general arrangement of the indicator lights 112, with one optical fiber 336 per indicator light 112. For the ease of assembly, the end of each optical fiber 336 may be press fit into the corresponding port or hole 344, with the port or hole 344 properly aligning and securely retaining the end of the optical fiber 336.

As illustrated, the external fitting 330 includes a face plate 346 that is disposed on or through the exterior surface of the housing 108, 208 or the door or cover 210 of the equipment cabinet 100, 200, such that the face plate 346 is visible to a person on the exterior of the equipment cabinet 100, 200. The external fitting 330 is configured to receive and retain the opposite ends of the optical fibers 336, holding the opposite ends of the optical fibers 336 near the exterior surface of the housing 108, 208 or the door or cover 210 of the equipment cabinet 100, 200. In this illustrative embodiment, the face plate 346 is a circular structure that defines an array of ports or holes 348 that are configured to receive the opposite ends of the optical fibers 336 and hold the opposite ends of the optical fibers 336 adjacent to labels 350 on the face plate 346 identifying the indicator light source for the light from each optical fiber 336. For example, the following labels 350 may be used, corresponding to each of the coupled indicator lights 112: P (POWER), D (DISC-ACT), S (STATUS), N (NS), and M (MS), such that light from each of the indicator lights 112 is transmitted through the corresponding one of the optical fibers 336 and through the face plate 346, such that the light is visible from the exterior of the equipment cabinet 100, 200. In general, these indicator lights 112 also indicate the power, memory access, and operational status of the CPU 102. Again, for the ease of assembly, the opposite end of each optical fiber 336 may be press fit into the corresponding port or hole 348, with the port or hole 348 properly aligning and securely retaining the opposite end of the optical fiber 336. The ports or holes 348 may be simple through-holes that expose the opposite ends of the optical fibers 336 outside the equipment cabinet 100, 200, or the ports or holes 348 may be enclosed via a transparent or semi-transparent layer or material at the exterior of the equipment cabinet 100, 200. As illustrated, the ports or holes 348 are arranged in a circular pattern, as are the corresponding labels 350, although such arrangement is not required and may be varied.

Figure 4:
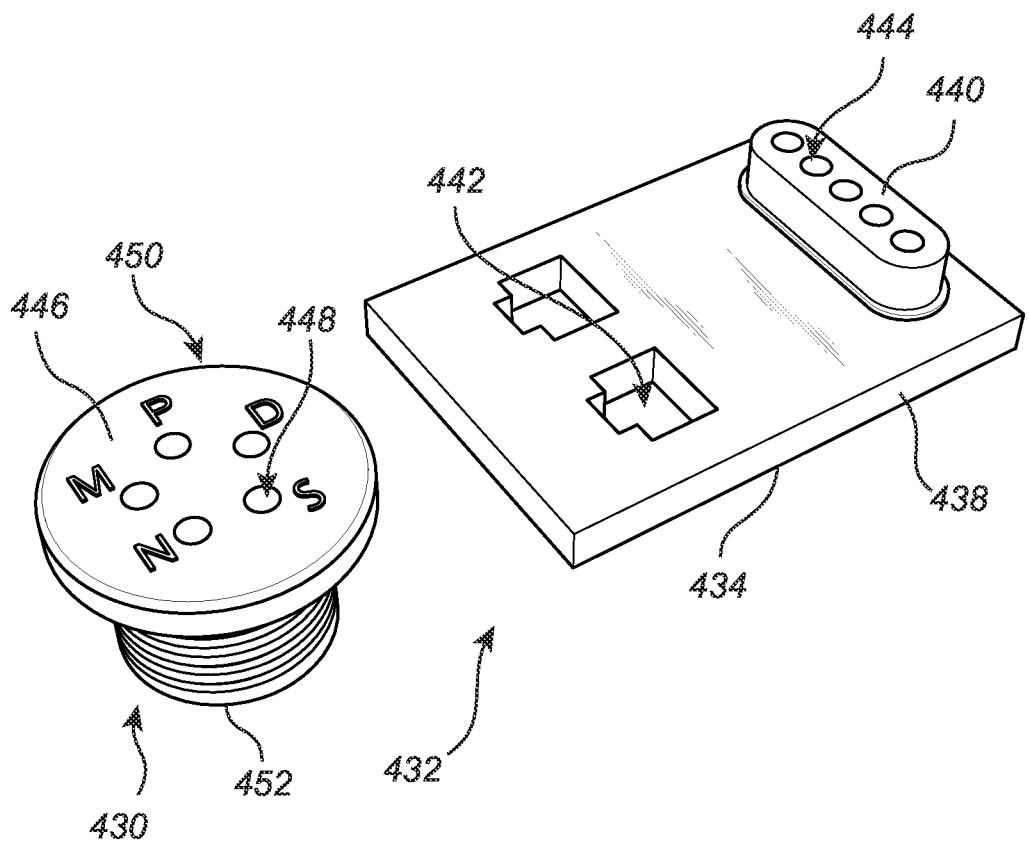
FIG. 4 is a front perspective view of one illustrative embodiment of the internal fitting of the present disclosure and one illustrative embodiment of the external fitting of the present disclosure.
Figure 5:
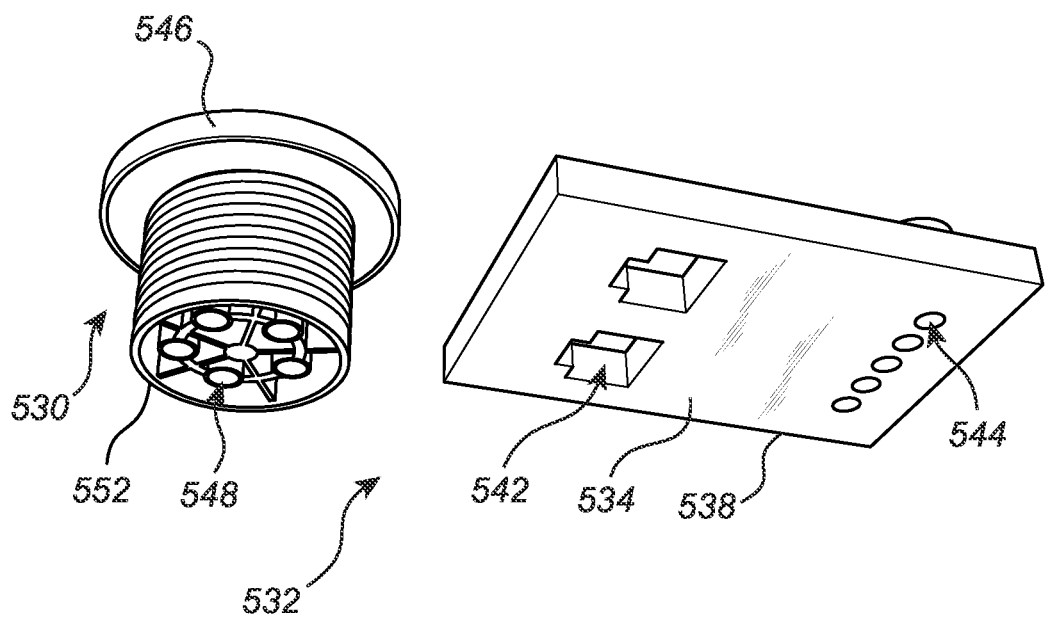
FIG. 5 is a back perspective view of one illustrative embodiment of the internal fitting of the present disclosure and one illustrative embodiment of the external fitting of the present disclosure.

Referring now specifically to FIGS. 4 and 5, the internal fitting 434, 534 again includes the CPU attachment plate 438, 538 that is disposed adjacent to the indicator lights 112 (FIG. 1) of the CPU 102 (FIG. 1) and the fiber optic coupler 440 that is configured to receive and retain the ends of the optical fibers 336 (FIG. 3), holding the ends of the optical fibers 336 adjacent to and optically coupling them with the indicator lights 112. In this illustrative embodiment, the CPU attachment plate 434, 534 is again planar structure that includes cutouts 442, 542 corresponding to one or more of the connectors 104 (FIG. 1) of the CPU 102. The CPU attachment plate 434, 534 is thereby secured to the face of the CPU 102 adjacent to the indicator lights 112 by plugging the cables 106 (FIG. 1) into the one or more connectors 104 through the CPU attachment plate 434, 534. In this illustrative embodiment, the fiber optic coupler 440 is an elongate structure that is integrally formed with the CPU attachment plate 434, 534 that defines the array of ports or holes 444, 544 that are configured to receive the ends of the optical fibers 336 and hold the ends of the optical fibers 336 adjacent to the indicator lights 112, such that light from each of the indicator lights 112 is transmitted through the corresponding one of the optical fibers 336. Accordingly, the shape of the fiber optic coupler 440 and the arrangement of the ports or holes 444, 544 preferably corresponds to the general arrangement of the indicator lights 112, with one optical fiber 336 per indicator light 112. Again, for the ease of assembly, the end of each optical fiber 336 may be press fit into the corresponding port or hole 444, 544, with the port or hole 444, 544 properly aligning and securely retaining the end of the optical fiber 336.

As illustrated, the external fitting 430, 530 again includes the face plate 446, 546 that is disposed on or through the exterior surface of the housing 108 (FIG. 1), 208 (FIG. 2) or the door or cover 210 (FIG. 2) of the equipment cabinet 100 (FIG. 1), 200 (FIG. 2), such that the face plate 446, 546 is visible to the person on the exterior of the equipment cabinet 100, 200. Here, the external fitting 430, 530 includes a threaded base 452, 552, disposed behind the face plate 446, 546 that is configured to engage a corresponding threaded hole in the housing 108, 208 or other exterior surface of the equipment cabinet 100, 200. This threaded base 452, 552 is configured to receive and retain the opposite ends of the optical fibers 336, holding the opposite ends of the optical fibers 336 near the exterior surface of the housing 108, 208 or the door or cover 210 of the equipment cabinet 100, 200. In this illustrative embodiment, the face plate 446, 546 is again a circular structure that defines the array of ports or holes 448, 548 that are configured to receive the opposite ends of the optical fibers 336 and hold the opposite ends of the optical fibers 336 adjacent to the labels 450 on the face plate 446, 546 identifying the indicator light source for the light from each optical fiber 336. Light from each of the indicator lights 112 is transmitted through the corresponding one of the optical fibers 336 and through the threaded base 452, 552 and face plate 446, 546, such that the light is visible from the exterior of the equipment cabinet 100, 200. Again, for the ease of assembly, the opposite end of each optical fiber 336 may be press fit into the corresponding port or hole 448, 548, with the port or hole 448, 548 properly aligning and securely retaining the opposite end of the optical fiber 336. The ports or holes 448, 548 may be simple through-holes that expose the opposite ends of the optical fibers 336 outside the equipment cabinet 100, 200, or the ports or holes 448, 548 may be enclosed via a transparent or semi-transparent layer or material at the exterior of the equipment cabinet 100, 200.

Figure 6:
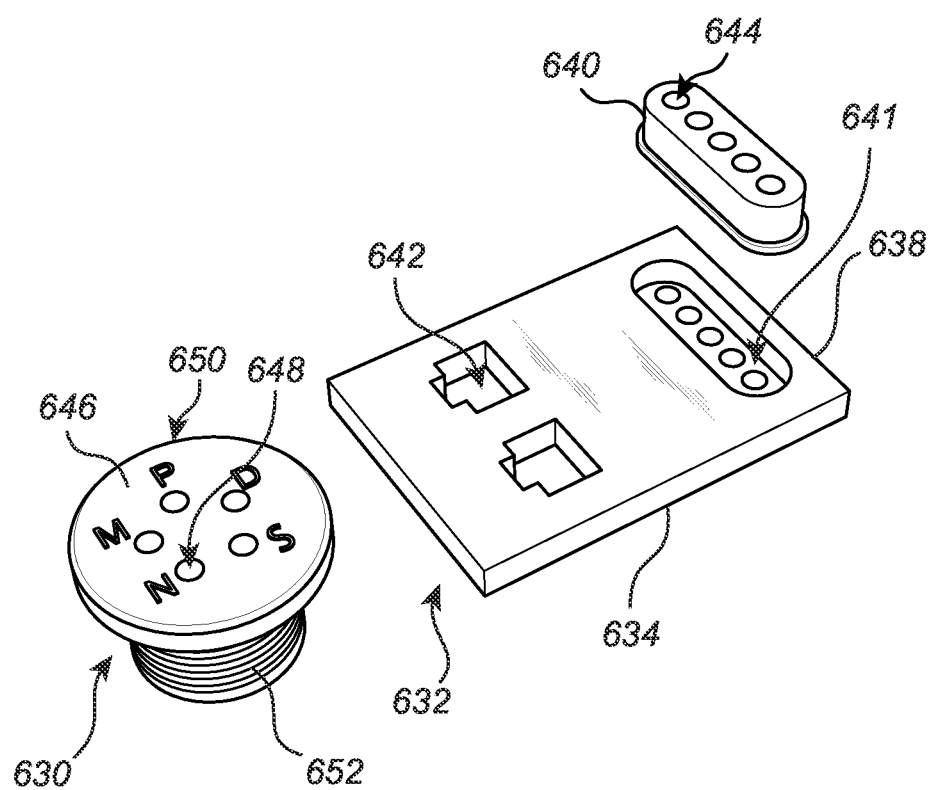
FIG. 6 is a front perspective view of another illustrative embodiment of the internal fitting of the present disclosure, utilizing a separate CPU attachment plate and fiber optic coupler, and one illustrative embodiment of the external fitting of the present disclosure.

Referring now specifically to FIG. 6, the internal fitting 634 again includes the CPU attachment plate 638 that is disposed adjacent to the indicator lights 112 (FIG. 1) of the CPU 102 (FIG. 1) and the fiber optic coupler 640 that is configured to receive and retain the ends of the optical fibers 336 (FIG. 3), holding the ends of the optical fibers 336 adjacent to and optically coupling them with the indicator lights 112. In this illustrative embodiment, the CPU attachment plate 634 is again planar structure that includes cutouts 642 corresponding to one or more of the connectors 104 (FIG. 1) of the CPU 102. The CPU attachment plate 634 is thereby secured to the face of the CPU 102 adjacent to the indicator lights 112 by plugging the cables 106 (FIG. 1) into the one or more connectors 104 through the CPU attachment plate 634. In this illustrative embodiment, the fiber optic coupler 640 is an elongate structure that is press-fit into a corresponding slot manufactured into the CPU attachment plate 634 that defines the array of ports or holes 644 that are configured to receive the ends of the optical fibers 336 and hold the ends of the optical fibers 336 adjacent to the indicator lights 112, such that light from each of the indicator lights 112 is transmitted through the corresponding one of the optical fibers 336. Accordingly, the shape of the fiber optic coupler 640 and the arrangement of the ports or holes 644 preferably corresponds to the general arrangement of the indicator lights 112, with one optical fiber 336 per indicator light 112. Again, for the ease of assembly, the end of each optical fiber 336 may be press fit into the corresponding port or hole 644, with the port or hole 644 properly aligning and securely retaining the end of the optical fiber 336.

As illustrated, the external fitting 630 again includes the face plate 646 that is disposed on or through the exterior surface of the housing 108 (FIG. 1), 208 (FIG. 2) or the door or cover 210 (FIG. 2) of the equipment cabinet 100 (FIG. 1), 200 (FIG. 2), such that the face plate 646 is visible to the person on the exterior of the equipment cabinet 100, 200. Here, the external fitting 630 again includes the threaded base 652, disposed behind the face plate 646 that is configured to engage the corresponding threaded hole in the housing 108, 208 or other exterior surface of the equipment cabinet 100, 200. This threaded base 652 is configured to receive and retain the opposite ends of the optical fibers 336, holding the opposite ends of the optical fibers 336 near the exterior surface of the housing 108, 208 or the door or cover 210 of the equipment cabinet 100, 200. In this illustrative embodiment, the face plate 646 is again a circular structure that defines the array of ports or holes 648 that are configured to receive the opposite ends of the optical fibers 336 and hold the opposite ends of the optical fibers 336 adjacent to the labels 650 on the face plate 646 identifying the indicator light source for the light from each optical fiber 336. Light from each of the indicator lights 112 is transmitted through the corresponding one of the optical fibers 336 and through the threaded base 652 and face plate 646, such that the light is visible from the exterior of the equipment cabinet 100, 200. Again, for the ease of assembly, the opposite end of each optical fiber 336 may be press fit into the corresponding port or hole 648, with the port or hole 648 properly aligning and securely retaining the opposite end of the optical fiber 336. The ports or holes 648 may be simple through-holes that expose the opposite ends of the optical fibers 336 outside the equipment cabinet 100, 200, or the ports or holes 648 may be enclosed via a transparent or semi-transparent layer or material at the exterior of the equipment cabinet 100, 200.

Figure 7:
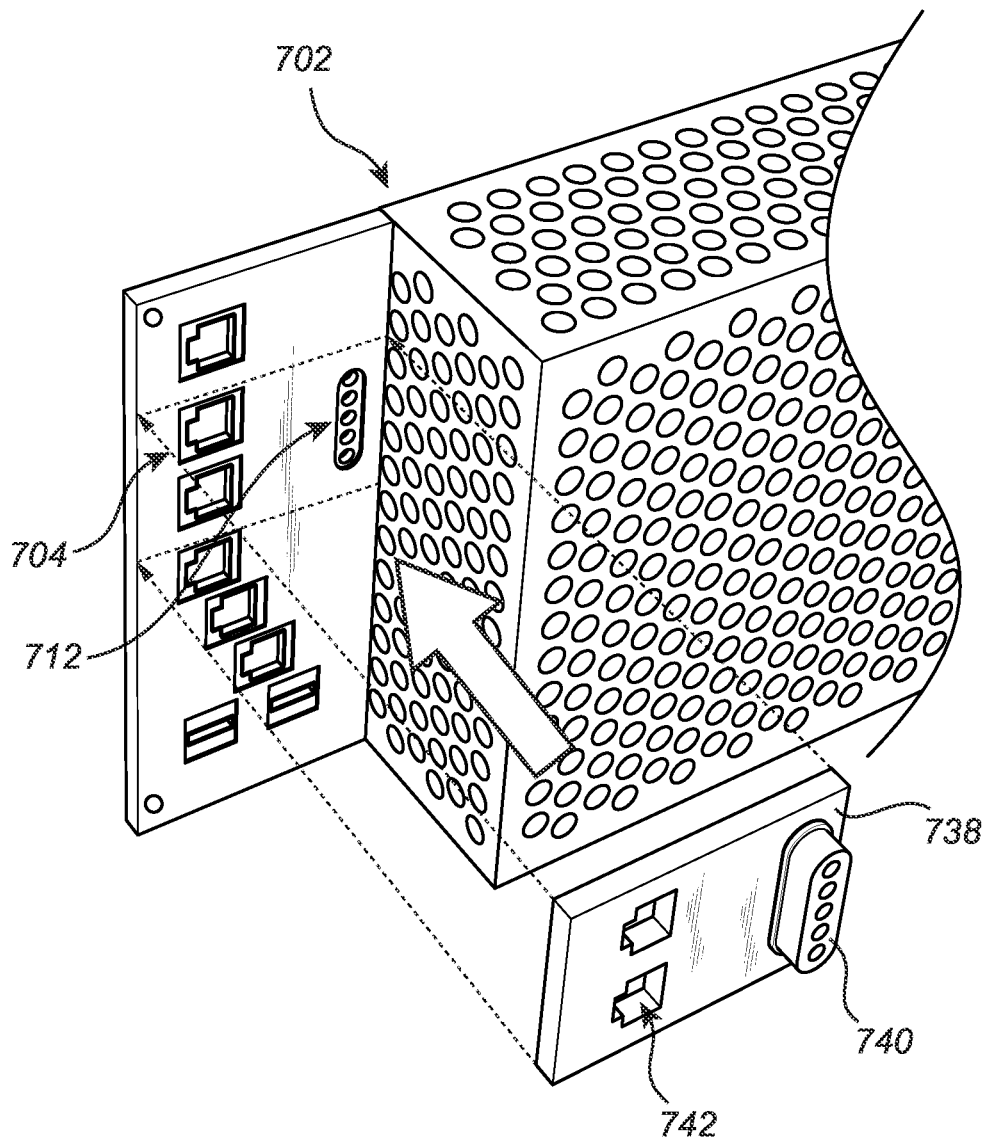
FIG. 7 is a partial perspective view of the interior of the equipment cabinet illustrating the installation of one illustrative embodiment of the internal fitting of the present disclosure adjacent to the CPU indicator lights within the equipment cabinet.

Referring now specifically to FIG. 7, the CPU attachment plate 738 and fiber optic coupler 740 are disposed adjacent to the indicator lights 712 of the CPU 702 within the equipment cabinet 100 (FIG. 1), 200 (FIG. 2), either collectively or in sequence. The fiber optic coupler 740 is configured to receive and retain the ends of the optical fibers 336 (FIG. 3), holding the ends of the optical fibers 336 adjacent to and optically coupling them with the indicator lights 712. The optical fibers 336 may be first press-fit into the fiber optic coupler 740, which may then be press-fit into the CPU attachment plate 738, which may first be coupled to the CPU 100, 200 and/or indicator lights 712. The CPU attachment plate 734 is again planar structure that includes cutouts 742 corresponding to one or more of the connectors 704 of the CPU 702. The CPU attachment plate 734 is thereby secured to the face of the CPU 702 adjacent to the indicator lights 712 by plugging the cables 106 (FIG. 1) into the one or more connectors 704 through the CPU attachment plate 734.

Figure 8:
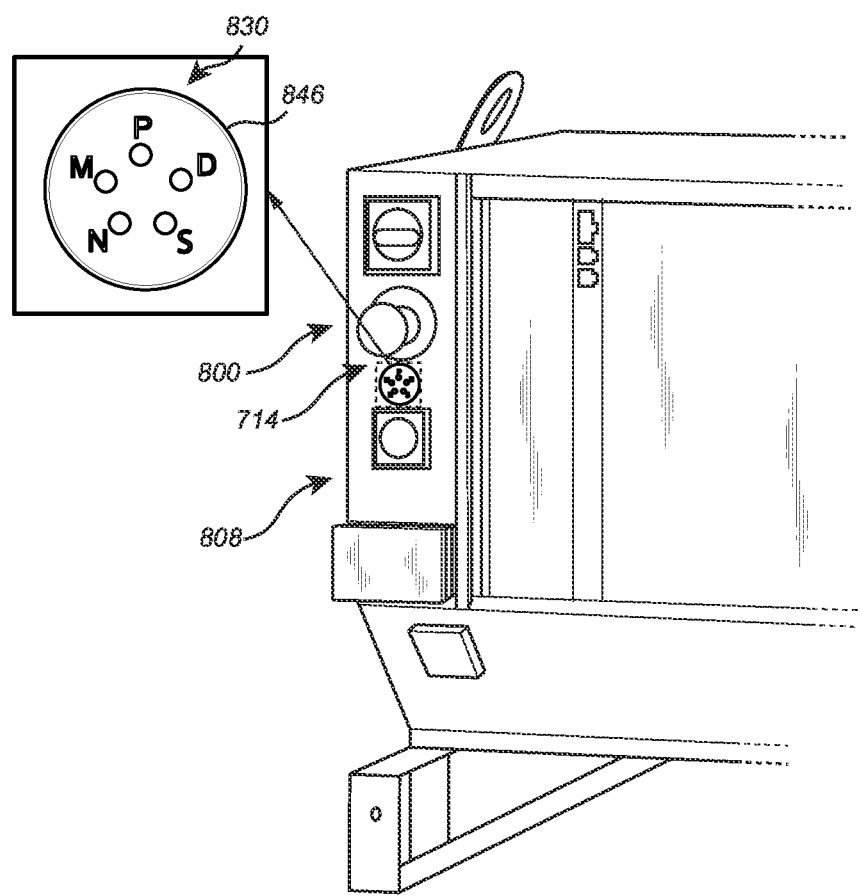
FIG. 8 is a partial perspective view of the exterior of the equipment cabinet illustrating the installation of one illustrative embodiment of the external fitting of the present disclosure, such that the CPU indicator lights can be visually observed by a person without opening the equipment cabinet.

Referring now specifically to FIG. 8, the external fitting 830 again includes the face plate 846 that is disposed on or through the exterior surface of the housing 808, user panel 814, or the door or cover 210 (FIG. 2) of the equipment cabinet 800, such that the face plate 846 is visible to the person on the exterior of the equipment cabinet 800, without opening the door or cover 210 of the equipment cabinet 800.

Figure 9:
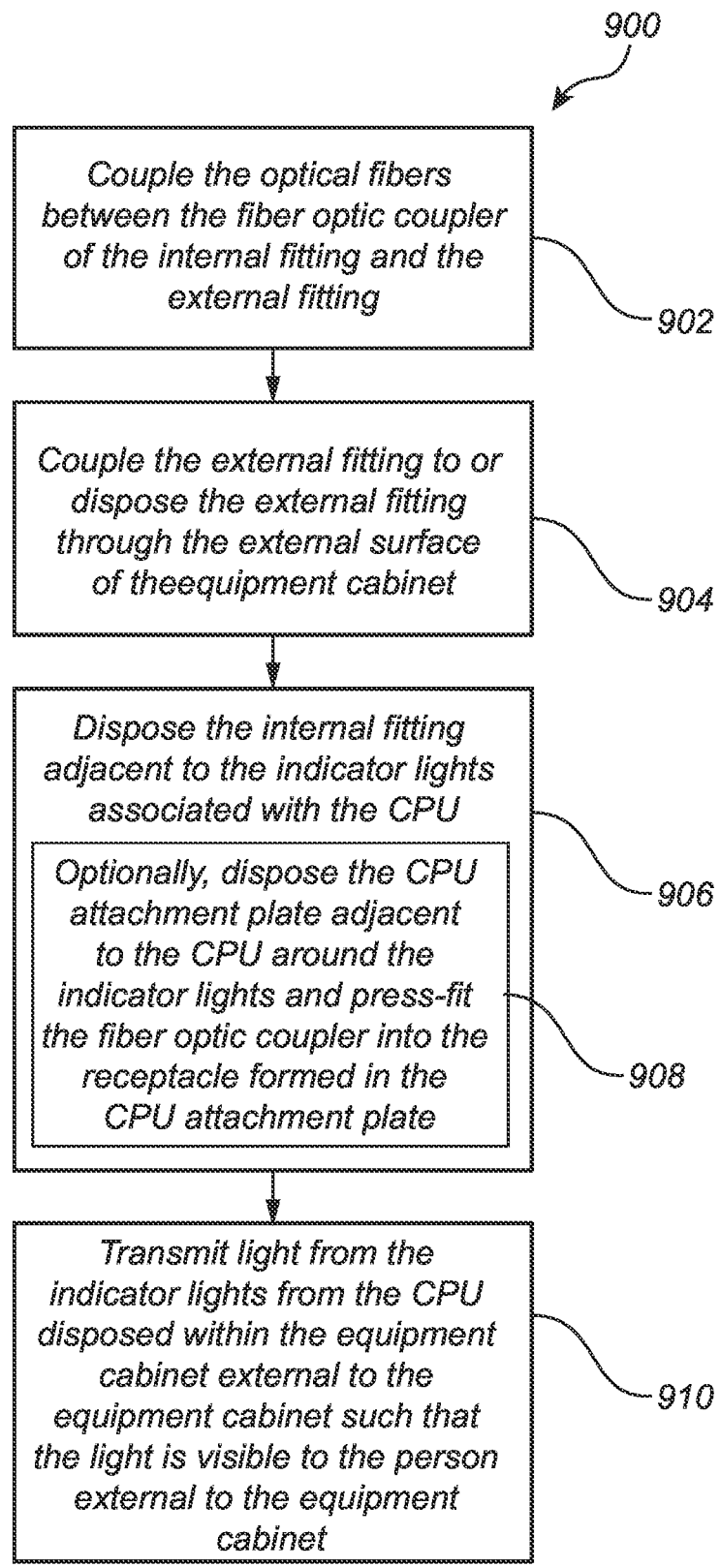
FIG. 9 is a flowchart of one illustrative embodiment of a method for installing the internal and external fittings of the present disclosure, such that the CPU indicator lights can be visually observed by a person without opening the equipment cabinet.

FIG. 9 is a flowchart of one illustrative embodiment of a method 900 for installing the internal and external fittings of the present disclosure, such that the CPU indicator lights can be visually observed by a person without opening the equipment cabinet. The method 900 first includes coupling the optical fibers between the fiber optic coupler of the internal fitting and the external fitting 902. The method 900 then includes coupling the external fitting to or disposing the external fitting through the external surface of the equipment cabinet 904. The method 900 then includes disposing the internal fitting adjacent to the indicator lights associated with the CPU 906. Optionally, the method 900 includes disposing the CPU attachment plate adjacent to the CPU around the indicator lights and press-fitting the fiber optic coupler into the receptacle formed in the CPU attachment plate 908. Finally, the method 900 includes transmitting light from the indicator lights from the CPU disposed within the equipment cabinet external to the equipment cabinet such that the light is visible to the person external to the equipment cabinet 910.

Thus, via the external indicator assembly of the present disclosure, CPU indicator lights can be observed by a person without opening an equipment cabinet. This allows the person to visually assess the status or power-down cycling of the CPU during a shutdown or restart process without or before opening the equipment cabinet, thereby preventing corruption of the CPU memory file and assuring personal safety by avoiding contact with powered components. Because the present disclosure takes the guesswork out of determining whether or not a CPU has fully powered up or powered down, fewer corrupted flash drives result, saving significant time and expense in a manufacturing facility.

It should be noted that the external indicator assembly of the present disclosure can also be used for general troubleshooting purposes and not solely to know when the CPU is done during a shutdown process. Below are some examples of how using the external indicator assembly can also aid with troubleshooting without having to open the equipment cabinet, which of course would also apply to other status lights associated with different controllers. These are illustrative only and should in no way be construed as being limiting in any manner.

TABLE 1

External Indicator Light Troubleshooting Meanings

| Indicator Light | LED Status | Status Meaning |
|---|---|---|
| POWER (P) | Extinguish | Normal boot. No fast module start within the CPU. |
| | Long bright | Completion of normal boot. |
| | Longer flashes, short off | Fault during startup. Power supply may be on. |
| | Shorter flashes, short off | Power failure. Reboot required. Power supply may be on. |
| DISC-Act (D) | Flicker | Memory is being accessed. |
| STATUS (S) | Red light | Loading BootLoader. |
| | Flashing red light | Loading data mirroring. |
| | Flashing green light | Loading RobotWare. |
| | Green light | System startup complete. |
| | Long flashing red light | Check memory. |
| | Long flashing green light | Check information prompts. |
| MS (M) | Extinguish | No power. |
| | Green light | Normal. |

TABLE 1-continued

External Indicator Light Troubleshooting Meanings

| Indicator Light | LED Status | Status Meaning |
|---|---|---|
| | Flashing green light | System parameter error. |
| | Flashing red light | Minor fault. |
| | Red/green blinking light | Self-test. |
| NS (N) | Extinguish | No power. |
| | Green light | Normal. |
| | Flashing green light | Module connection error. |
| | Flashing red light | Module connection timeout. |
| | Red light | Communication error. |

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. An external indicator assembly for a central processing unit disposed within an equipment cabinet having a housing defining an opening, the external indicator assembly comprising:
   one of a door and a cover adapted to close the opening defined by the housing;
   an internal fitting adapted to be disposed within the housing of the equipment cabinet and secured to the central processing unit adjacent to one or more indicator lights on the central processing unit;
   an external fitting adapted to be disposed through and coupled to one of the door and the cover; and
   one or more optical fibers adapted to be coupled between the internal fitting and the external fitting such that light from the one or more indicator lights is transmitted from the central processing unit disposed within the housing of the equipment cabinet external to the housing of the equipment cabinet through the one of the door and cover and the external fitting such that the light is visible to a person external to the equipment cabinet.

2. The external indicator assembly of claim 1, wherein the internal fitting comprises a central processing unit attachment plate and a fiber optic coupler.

3. The external indicator assembly of claim 2, wherein the fiber optic coupler is integrally formed with the central processing unit attachment plate.

4. The external indicator assembly of claim 2, wherein the fiber optic coupler is press-fit into a receptacle formed in the central processing unit attachment plate.

5. The external indicator assembly of claim 2, wherein the fiber optic coupler defines one or more ports configured to receive the one or more optical fibers and hold an end of each of the one or more optical fibers adjacent to a corresponding one of the one or more indicator lights.

6. The external indicator assembly of claim 1, wherein the external fitting defines one or more ports configured to receive the one or more optical fibers and hold an end of each of the one or more optical fibers such that light from the end of the optical fiber is visible to the person external to the equipment cabinet.

7. The external indicator assembly of claim 1, wherein the one or more indicator lights comprise a plurality of indicator lights and the one or more optical fibers comprise a plurality of optical fibers adapted to be coupled between the internal fitting and the external fitting.

8. An equipment cabinet, comprising:
a housing defining an opening;
one of a door and a cover adapted to close the opening defined by the housing;
a central processing unit disposed within the housing;
an external indicator assembly, comprising:
an internal fitting adapted to be disposed within the housing and secured to the central processing unit adjacent to one or more indicator lights on the central processing unit;
an external fitting adapted to be disposed through and coupled to one of the door and the cover; and
one or more optical fibers adapted to be coupled between the internal fitting and the external fitting such that light from the one or more indicator lights is transmitted from the central processing unit disposed within the housing external to the housing through the one of the door and the cover of the housing and the external fitting such that the light is visible to a person external to the equipment cabinet.

9. The equipment cabinet of claim 8, wherein the internal fitting comprises a central processing unit attachment plate and a fiber optic coupler.

10. The equipment cabinet of claim 9, wherein the fiber optic coupler is integrally formed with the central processing unit attachment plate.

11. The equipment cabinet of claim 9, wherein the fiber optic coupler is press-fit into a receptacle formed in the central processing unit attachment plate.

12. The equipment cabinet of claim 9, wherein the fiber optic coupler defines one or more ports configured to receive the one or more optical fibers and hold an end of each of the one or more optical fibers adjacent to a corresponding one of the one or more indicator lights.

13. The equipment cabinet of claim 8, wherein the external fitting defines one or more ports configured to receive the one or more optical fibers and hold an end of each of the one or more optical fibers such that light from the end of the optical fiber is visible to the person external to the equipment cabinet.

14. The equipment cabinet of claim 8, wherein the one or more indicator lights comprise a plurality of indicator lights and the one or more optical fibers comprise a plurality of optical fibers adapted to be coupled between the internal fitting and the external fitting.

15. The equipment cabinet of claim 8, wherein the equipment cabinet is an automotive manufacturing robot equipment cabinet.

16. A method for installing an external indicator assembly for a central processing unit disposed within an equipment cabinet having a housing defining an opening and one of a door and a cover adapted to close the opening defined by the housing, the method comprising:
disposing an internal fitting within the housing of the equipment cabinet and securing the internal fitting to the central processing unit adjacent to one or more indicator lights on the central processing unit;
disposing the external fitting through and coupling the external fitting to one of the door and the cover; and
coupling one or more optical fibers between the internal fitting and the external fitting such that light from the one or more indicator lights is transmitted from the central processing unit disposed within the housing of the equipment cabinet external to the housing of the equipment cabinet through the one of the door and cover and the external fitting such that the light is visible to a person external to the equipment cabinet.

17. The method of claim 16, wherein the internal fitting comprises a central processing unit attachment plate and a fiber optic coupler.

18. The method of claim 17, further comprising press-fitting the fiber optic coupler into a receptacle formed in the central processing unit attachment plate.

19. The method of claim 17, wherein the fiber optic coupler defines one or more ports configured to receive the one or more optical fibers and hold an end of each of the one or more optical fibers adjacent to a corresponding one of the one or more indicator lights.

20. The method of claim 16, wherein the external fitting defines one or more ports configured to receive the one or more optical fibers and hold an end of each of the one or more optical fibers such that light from the end of the optical fiber is visible to the person external to the equipment cabinet.

* * * * *